United States Patent
Mason et al.

(10) Patent No.: US 10,772,177 B2
(45) Date of Patent: Sep. 8, 2020

(54) CONTROLLING A LIGHTING SYSTEM

(71) Applicant: SIGNIFY HOLDING B.V., Eindhoven (NL)

(72) Inventors: Jonathan David Mason, Waalre (NL); Dzmitry Viktorovich Aliakseyeu, Eindhoven (NL); Philip Steven Newton, Waalre (NL); Remco Magielse, Tilburg (NL); Bas Driesen, Weert (NL); Marjolein Dimmie Van Der Zwaag, Eindhoven (NL); Ramon Eugene Franciscus Van De Ven, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/095,087

(22) PCT Filed: Apr. 12, 2017

(86) PCT No.: PCT/EP2017/058809
§ 371 (c)(1),
(2) Date: Oct. 19, 2018

(87) PCT Pub. No.: WO2017/182365
PCT Pub. Date: Oct. 26, 2017

(65) Prior Publication Data
US 2019/0124745 A1 Apr. 25, 2019

(30) Foreign Application Priority Data

Apr. 22, 2016 (EP) .................................... 16166633

(51) Int. Cl.
*H05B 47/155* (2020.01)
*G06T 7/90* (2017.01)
(Continued)

(52) U.S. Cl.
CPC ....... *H05B 47/155* (2020.01); *G06F 3/04847* (2013.01); *G06K 9/6202* (2013.01);
(Continued)

(58) Field of Classification Search
CPC . H05B 37/029; H05B 47/155; G06F 3/04847; G06F 2212/1721;
(Continued)

(56) References Cited

U.S. PATENT DOCUMENTS 7,932,953 B2 * 4/2011 Gutta ....................... H04N 9/73
348/602
8,063,992 B2 11/2011 Gutta et al.
(Continued)

OTHER PUBLICATIONS

"Video to DMX 512", Internet Archive WaybackMchine, Dec. 10, 2010, pp. 1-3.*
(Continued)

*Primary Examiner* — Shen Shiau
(74) *Attorney, Agent, or Firm* — Akrash P. Belagodu

(57) ABSTRACT

A lighting script—for use by a lighting controller to control at least one luminaire to render illumination effects, as the video content is outputted in a space illuminated by the at least one luminaire, synchronously with the outputting of the video content—is generated as follows. Frame image data of the video content is processed to determine at least one color palette of the frame image data. A sequence of illumination effects—to be rendered during the outputting of the video content and which is modifiable by a user—is displayed to the user. The displayed sequence conveys at least one illumination color derived from the determined color palette to be rendered in at least one of the illumination effects. The generated lighting script is for rendering the modified sequence of illumination effects.

11 Claims, 6 Drawing Sheets

(51) Int. Cl.
*G06F 3/0484* (2013.01)
*G06K 9/62* (2006.01)
*G02B 27/06* (2006.01)

(52) U.S. Cl.
CPC .............. *G06K 9/6219* (2013.01); *G06T 7/90* (2017.01); *G02B 27/06* (2013.01); *G06F 2212/1721* (2013.01); *G06T 2207/10016* (2013.01); *G06T 2207/10024* (2013.01); *G06T 2207/20072* (2013.01)

(58) Field of Classification Search
CPC ...... G05B 2219/2642; G05B 2219/163; G05B 2219/23238; G05B 2219/25011; G06T 15/50; G02B 27/06
See application file for complete search history.

(56) References Cited

U.S. PATENT DOCUMENTS

| | | | | |
|---|---|---|---|---|
| 9,485,837 | B2* | 11/2016 | Van De Sluis | H05B 47/12 |
| 9,763,308 | B2* | 9/2017 | Aliakseyeu | H05B 47/105 |
| 2005/0248299 | A1* | 11/2005 | Chemel | H05B 47/155 |
| | | | | 315/312 |
| 2005/0275626 | A1* | 12/2005 | Mueller | H05B 47/125 |
| | | | | 345/156 |
| 2007/0091111 | A1* | 4/2007 | Gutta | H04N 9/73 |
| | | | | 345/591 |
| 2007/0242162 | A1* | 10/2007 | Gutta | H04N 9/73 |
| | | | | 348/645 |
| 2009/0219305 | A1* | 9/2009 | Diederiks | H04N 9/73 |
| | | | | 345/690 |
| 2010/0026206 | A1* | 2/2010 | Sekulovski | H05B 47/10 |
| | | | | 315/294 |
| 2010/0176752 | A1* | 7/2010 | Xiong | H05B 47/10 |
| | | | | 315/363 |
| 2010/0177247 | A1* | 7/2010 | Sekulovski | H05B 47/10 |
| | | | | 348/602 |
| 2010/0201878 | A1* | 8/2010 | Barenbrug | H04N 21/4318 |
| | | | | 348/563 |
| 2011/0035404 | A1* | 2/2011 | Morgan | H05B 47/155 |
| | | | | 707/769 |
| 2011/0075036 | A1* | 3/2011 | Galeazzi | H04N 5/64 |
| | | | | 348/602 |
| 2013/0148020 | A1* | 6/2013 | Cook | H05B 47/19 |
| | | | | 348/460 |
| 2015/0130373 | A1* | 5/2015 | Van De Sluis | H05B 47/19 |
| | | | | 315/308 |
| 2016/0338174 | A1* | 11/2016 | Aliakseyeu | H04B 47/19 |
| 2017/0142809 | A1* | 5/2017 | Paolini | H05B 47/19 |
| 2017/0347427 | A1* | 11/2017 | Cole | H04N 21/4131 |
| 2018/0041820 | A1* | 2/2018 | Xu | H04N 21/8456 |
| 2018/0049287 | A1* | 2/2018 | Lu | F21K 9/238 |
| 2018/0098408 | A1* | 4/2018 | Hubbers | H05B 47/105 |
| 2018/0236354 | A1* | 8/2018 | Van Boven | H05B 47/155 |
| 2019/0069375 | A1* | 2/2019 | Baker | H04N 7/08 |
| 2019/0099668 | A1* | 4/2019 | Aliakseyeu | A63F 13/28 |
| 2019/0166674 | A1* | 5/2019 | Mason | H04N 21/42202 |
| 2019/0215938 | A1* | 7/2019 | Paolini | H05B 47/155 |
| 2020/0022238 | A1* | 1/2020 | Aliakseyeu | H05B 47/155 |

OTHER PUBLICATIONS

"Sync Video and Lights without Tinnecode", Internet Archive WaybackMchine, Feb. 9, 2011, pp. 1-3.*
"DMX Ambient Lighting Video Drives the Lights!", Internet Archive WaybackMchine, Oct. 26, 2013, pp. 1-5.*
He Zhang, et al., "An Improved Shot Segmentation Algorithm Based on Color Histograms for Decompressed Vidoes," 6th International Congress on Image and Signal Processing, 2013 (5 pages).
"DMX Ambient Lighting Video Drives the Lights!," DMX Ambient Lighting, DMX Software Controller, Retrieved From Internet at https://www.lightjames.com/video.html, on Oct. 18, 2018 (4 pages).

* cited by examiner

CONTROLLING A LIGHTING SYSTEM

CROSS-REFERENCE TO PRIOR APPLICATIONS

This application is the U.S. National Phase application under 35 U.S.C. § 371 of International Application No. PCT/EP2017/058808, filed on Apr. 12, 2017, which claims the benefit of European Patent Application No. 16166633.4, filed on Apr. 22, 2016. These applications are hereby incorporated by reference herein.

TECHNICAL FIELD

The present invention relates to a method of automatically controlling a lighting system to render illumination effects as a piece of video content is outputted in a space illuminated by the lighting system.

BACKGROUND

Connected lighting systems are a class of lighting systems comprising networked illumination sources ("luminaires"), preferably connected via a wireless network so that the illumination sources are wirelessly controllable. These illumination sources can be controlled from various user interfaces, such as smartphone and tablet applications, via internet services, or via connected physical devices such as sensors and switches. The behaviour that can be assigned to a connected lighting system offers more opportunities than traditional lighting systems. For an end-user it is possible to specify how he wants his lighting system to behave. It is even possible to specify different forms of behaviour at different moments in time. In other words the user is now able to use his lighting system not only for illumination or atmosphere creation but as a way to support or enhance any other activities happing in the home environment or online, e.g. for entertainment, security, notifications, etc.

One of the most common usages of coloured connected lighting is to enhance people's daily activities. For instance, additional functionality now becomes possible in other domains such as smart homes and entertainment. E.g. it is known to add matching dynamic coloured light around a television to enhance the experience of watching TV, movies or other video content. With connected lighting systems becoming more commonplace in the home, these types of immersive experiences can even be obtained without the need to buy a dedicated entertainment lighting system.

A user may use a scripting application to generate his own lighting scenes to accompany a piece of video content when outputted in a space illuminated by a lighting system. The user may be content consumer (i.e. end user), or the user may be a developer who is, say, supplying the lighting script to content consumers e.g. the lighting script may be distributed with the video content to which it relates.

By generating a suitable lighting script, the user can specify specific illumination effects to be rendered by the lighting system at specific times within the video content i.e. relative to visual events in the video content. The lighting script thus defines a sequence of user-customized illumination effects to be rendered by a lighting system as the video content is played out in a space illuminated by the lighting system, thereby rendering the user's desired lighting scene. The lighting script is a computer-implemented data structure, which a lighting controller of the lighting system can use to render the defined sequence of illumination effects synchronously with the outputting of the video content in the illuminated space, by tracking the outputting of the video content in a suitable manner. Lighting scripts are known in the art, as are lighting controllers with the necessary functionality to use them in this manner.

SUMMARY

Currently available scripting applications can provide a user with significant freedom in the lighting scenes he can script. However, the downside is that it can take a lot of time to generate for the user to generate script using existing tools, even for short video content of limited duration (e.g. a few minutes).

Various aspects of the present invention pertain to an improved lighting script application, for generating a lighting script of the kind described above. To simplify and speed up the scripting process for the user, the scripting application of the present invention processes frame image data of the video content to automatically determine one or more colour palettes of the video content, from which one or more illumination colours to be rendered in one or more of the lighting effects can be derived. For example, illumination colour(s) may be derived automatically from the colour palette(s), e.g. to generate a "default" but nonetheless bespoke sequence of illumination effects specific to the video content, which the user can then modify to customize to his individual desires. These are default in the sense that they are generated automatically from the video content, but are specific to the video content in the sense that illumination colour(s) of the illumination effect(s) match colour(s) of the video content. As another example, alternatively or in addition, a colour selector(s) derived from the determined colour palette(s) may be displayed to the user, which he can use to manually select individual illumination colours and/or a set of colours (e.g. all colours) of the colour palette for incorporation into the sequence of lighting effects.

A first aspect of the present invention is directed to a computer-implemented method of generating a lighting script for a piece of video content. The lighting script is for use by a lighting controller to control at least one luminaire to render illumination effects—as the video content is outputted in a space illuminated by the at least one luminaire—synchronously with the outputting of the video content. The method comprising executing a scripting application on a computer to implement the following steps:

processing frame image data of the video content to determine at least one colour palette of the frame image data;

controlling display apparatus of the computer to display to a user of the computer a sequence of illumination effects to be rendered during the outputting of the video content, wherein the illumination timeline conveys at least one illumination colour derived from the determined colour palette to be rendered in at least one of the illumination effects;

receiving from the user via user input apparatus of the computer at least one effect modification instruction, and modifying the displayed sequence of illumination effects according to the received at least one instruction; and generating a lighting script for use by the lighting controller in controlling the at least one luminaire during the outputting of the video content in the illuminated space to render the modified sequence of illumination effects.

The term "colour palette" means one or more colour characteristics of one or more frame images of the video content, and may for example be a set of one or more colour parameters derived from the frame image(s) that represent those colour characteristic(s). The colour parameters can take a number of different forms, such as hue values, brightness values and/or saturation values; chrominance and/or luminance values; RGB values, XYZ values YZY values etc. Such a colour palette may comprise only one type of parameter (e.g. only hue value(s), ignoring brightness and saturation), or multiple types of parameter (e.g. two or more of hue value(s), brightness value(s) and saturation values(s)). For the avoidance of doubt, it is noted that luminance, brightness and the like are considered colour characteristics in the context of the present invention. The parameters may be one-dimensional values, or multi-dimensional vectors (e.g. 2D or 3D colour vectors in a 2D or 3D colour space).

Note that the displayed sequence of illumination effects need not convey every detail of the illumination effects that are eventually rendered by the at least one luminaire (indeed, not every last detail of the illumination effects may have been set by then), and may for example convey higher level information to convey an overall impression that will be created when that illumination effect is eventually rendered.

In embodiments, the steps may further comprise: controlling the display apparatus to display a colour selector derived from the determined colour palette, wherein the at least one illumination colour is selected by the user via the user input apparatus of the computer using the displayed colour selector.

The steps may further comprise: processing the video content to generate a video timeline conveying visual changes in the video content; and controlling the display apparatus to display the video timeline in association with the sequence of illumination effects.

The processing step may comprise determining a respective colour palette of each of a plurality of segments of the video content; wherein the displayed sequence of illumination effects may comprise a respective illumination effect for each of the segments of the video content, and conveys to the user, for at least one of the segments, at least one illumination colour derived from its respective colour palette to be rendered in its respective illumination effect.

The processing step may comprise automatically determining the segments by comparing to one another respective colour characteristics of frame images of the video content.

The processing step may comprise determining a plurality of individual colour palettes for the frame images, which are used in said comparison.

Said comparison may comprise: applying a hierarchical clustering algorithm to the individual colour palettes, and/or comparing differences between the individual colour palettes with a colour matching threshold, and/or detecting deviations in the individual colour palettes from a base colour.

The segments may be automatically determined according to at least one segmentation instruction received from the user via the user input apparatus.

The at least one segmentation instruction from the user sets at least one of the following:
a number of frames images for which each of the individual colour palettes is to be determined,
the colour matching threshold,
the base colour (alternatively, the base colour may be determined automatically, by the scripting application, by processing the frame images),
a start point for a segment,
an endpoint for a segment,
a segmentation frequency,
a maximum segment duration,
a minimum segment duration.

Alternatively or in addition, said comparison may comprise determining a rate of change of at least colour characteristic across the frame images.

The steps may comprise generating at least one colour histogram of the frame image data, which is used to determine the at least one colour palette.

The steps may further comprise receiving an indication of at least one colour rendering capability of the at least one luminaire, which is used by the scripting application in the processing step to generate the at least one colour palette.

A second aspect of the present invention is directed to a method of controlling illumination emitted by at least one luminaire as a piece of video content is outputted in a space illuminated by the at least one luminaire, the method comprising: executing a scripting application on a computer; processing, by the scripting application, frame image data of the video content to determine at least one colour palette of the frame image data; controlling, by the scripting application, display apparatus of the computer to display to a user of the computer a sequence of illumination effects to be rendered during the outputting of the video content, wherein the displayed sequence conveys at least one illumination colour derived from the determined colour palette to be rendered in at least one of the illumination effects; receiving, by the scripting application, from the user via user input apparatus of the computer at least one effect modification instruction, and modifying the displayed sequence of illumination effects according to the received at least one instruction; and controlling, by a lighting controller, the at least one luminaire during the outputting of the video content in the illuminated space to render the modified sequence of illumination effects.

A third aspect of the present invention is directed to a computer-implemented method of generating a lighting script for a piece of video content, the lighting script for use by a lighting controller to control at least one luminaire to render illumination effects, as the video content is outputted in a space illuminated by the at least one luminaire, synchronously with the outputting of the video content, the method comprising executing a scripting application on a computer to implement the following steps: processing frame image data of the video content to determine at least one colour palette of the frame image data; controlling display apparatus to display a colour selector derived from the determined colour palette; receiving from the user via user input apparatus of the computer a selection of at least one illumination colour of the displayed colour selector; controlling the display apparatus of the computer to display to the user a sequence of illumination effects to be rendered during the outputting of the video content, wherein the displayed sequence conveys a rendering of the selected at least one illumination colour in at least one of the illumination effects; and generating a lighting script for use by the lighting controller in controlling the at least one luminaire during the outputting of the video content in the illuminated space to render the sequence of illumination effects.

A fourth aspect of the present invention is directed to a method of controlling illumination emitted by at least one luminaire as a piece of video content is outputted in a space illuminated by the at least one luminaire, the method comprising: executing a scripting application on a computer; processing, by the scripting application, frame image data of the video content to determine at least one colour palette of the frame image data; controlling, by the scripting application, display apparatus to display a colour selector derived from the determined colour palette; receiving, by the scripting application, from the user via user input apparatus of the computer a selection of at least one illumination colour of the displayed colour selector; controlling, by the scripting application, the display apparatus of the computer to display to the user a sequence of illumination effects to be rendered during the outputting of the video content, wherein the displayed sequence conveys a rendering of the selected at least one illumination colour in at least one of the illumination effects; and controlling, by a lighting controller, the at least one luminaire during the outputting of the video content in the illuminated space to render the modified sequence of illumination effects.

A fifth aspect of the present invention is directed to a computer-implemented method of generating a lighting script for a piece of video content, the lighting script for use by a lighting controller to control at least one luminaire to render different illumination colours, as the video content is outputted in a space illuminated by the at least one luminaire, synchronously with the outputting of the video content, the method comprising executing a scripting application on a computer to implement the following steps: processing frame image data of the video content to determine at least one colour palette of the frame image data; controlling display apparatus to display a colour selector derived from the determined colour palette; receiving from the user via user input apparatus of the computer a selection of at least one illumination colour of the displayed colour selector; controlling the display apparatus of the computer to display to the user a sequence of illumination colours to be rendered during the outputting of the video content, which comprises the selected at least one illumination colour; and generating a lighting script for use by the lighting controller in controlling the at least one luminaire during the outputting of the video content in the illuminated space to render the sequence of illumination colours.

A sixth aspect of the present invention is directed to a method of controlling illumination emitted by at least one luminaire as a piece of video content is outputted in a space illuminated by the at least one luminaire, the method comprising: executing a scripting application on a computer; processing, by the scripting application, frame image data of the video content to determine at least one colour palette of the frame image data; controlling, by the scripting application, display apparatus to display a colour selector derived from the determined colour palette; receiving from the user via user input apparatus of the computer a selection of at least one illumination colour of the displayed colour selector; controlling, by the scripting application, the display apparatus of the computer to display to the user a sequence of illumination colours to be rendered during the outputting of the video content, which comprises the selected at least one illumination colour; and controlling, by a lighting controller, the at least one luminaire during the outputting of the video content in the illuminated space to render the sequence of illumination colours.

Any features of the method of the first aspect or any embodiment thereof may be implemented in embodiments of any one of the second to sixth aspects.

A seventh aspect of the present invention is directed to a computer comprising: display apparatus; and a processor connected to the display apparatus, and configured to execute a scripting application and thereby implement any of the method steps disclosed herein.

An eighth aspect of the present invention is directed to a computer program product comprising a scripting application stored on a computer readable storage medium, the scripting application being configured when executed on a computer to implement any of the method steps disclosed herein.

BRIEF DESCRIPTION OF FIGURES

For a better understanding of the present invention and to show how embodiments of the same may be carried into effect reference is made to the following figures, in which.

DETAILED DESCRIPTION OF EXAMPLE EMBODIMENTS

In the exemplary embodiments described below, a scripting application is described which has a means of pre-generating colour palettes and displaying them to a user as selectable display elements ("colour selectors") to speed up the scripting process. The scripting application enables the user, be he an expert or a novice, to create a light script that can then be linked to the video content.

When the user selects a video for scripting, the described scripting tool automatically segments the video stream into segments where the colour palettes differ significantly from the previous one. The scripting tool also takes into account that the colours from the palettes are intended to be rendered on a connected lighting system, by accounting for the colour rendering capabilities of the lighting system when generating the colour palettes, to bias the colour palettes towards colours that are more susceptible to proper rendering by the lighting system. These pre-generated palettes are then used by the scripting application to help the user quickly and efficiently build a lighting script.

Further details of the scripting application are described below. First a useful context in which the generated lighting script can be used to deliver an immersive multimedia experience will be described.

Figure 1:
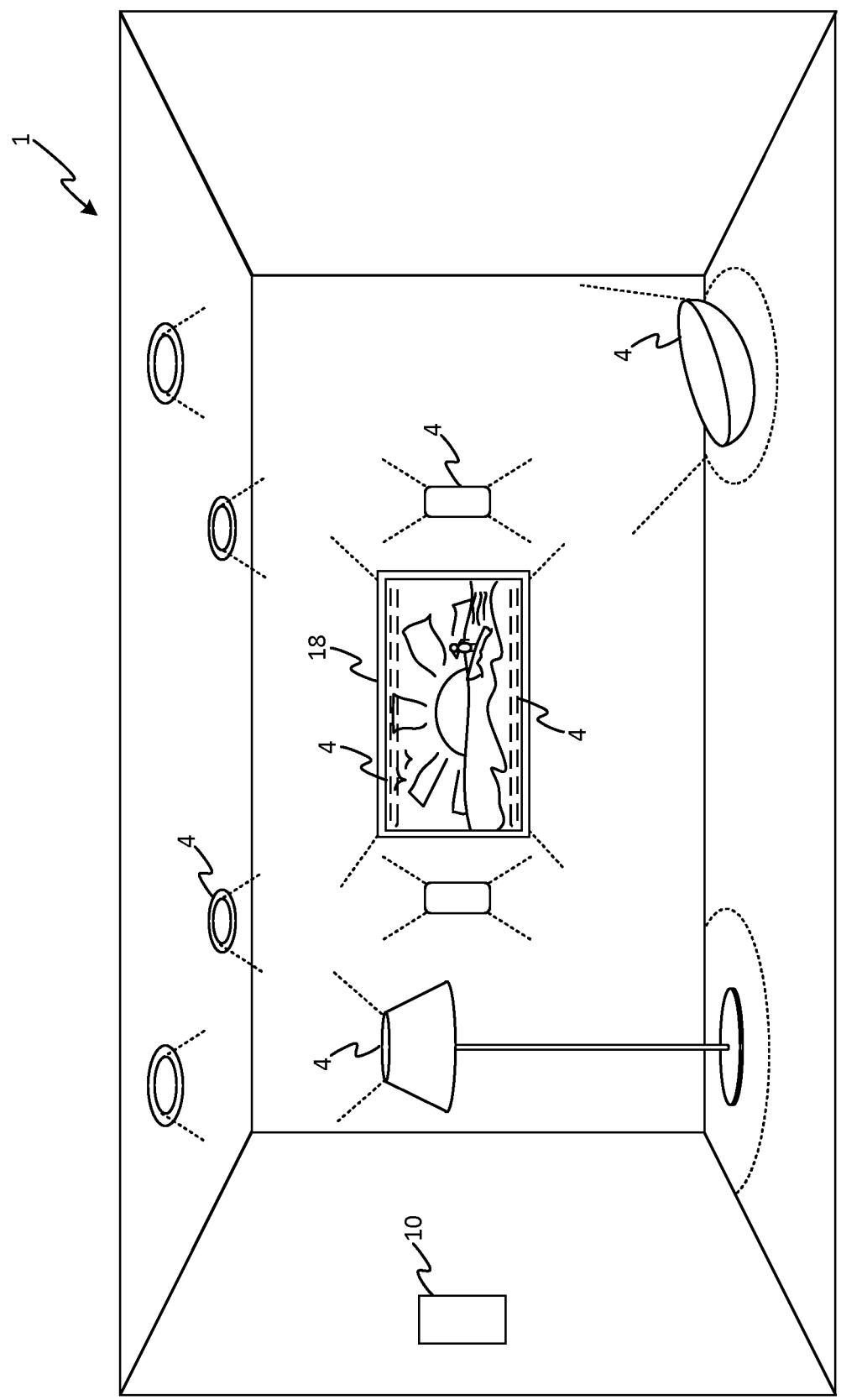
FIG. 1 shows a perspective view of a part of a space illuminated by a lighting system, in which a piece of video content is being outputted.

FIG. 1 shows a perspective view of a space illuminated by a lighting system 1. The lighting system 1 comprises a plurality of luminaires 4 and a control unit 10. The luminaires 4 are connected to the control unit 10 such that the control unit 10 can communicate control signals to the luminaires. In this manner, the luminaires 4 form a lighting network controlled by the control unit 10.

The luminaires 4 are arranged to illuminate the space and can take various different forms. The space is a room in this example, such as a user's living room or bedroom, but the techniques can equally be applied to other spaces such as an indoor outdoor cinema, or in an office etc. The control unit 10 provides intelligent control of the luminaires 4, and in particular is able to a colour of illumination emitted by each of the luminaires 4, by varying one or more colour settings of that luminaire, such as chrominance (e.g. U and/or V) and/or luminance (Y) settings, RGB settings, XYZ settings, Yxy settings, and/or one or more colour temperature settings etc.

A media device 18 is shown located in the space illuminated by the lighting system 1. The media device 18 is capable of outputting a piece of video content (16 in FIGS. 2A, 2B), such as a video file, by displaying frame images (frames) of the video content in quick succession on a display of the media device 18 in the conventional manner, whilst simultaneously outputting any accompanying audio data of the video content via loudspeaker(s). The media device 18 is shown at a moment in time at which it is displaying a frame of the video content.

The media device 18 is a television (TV), such as a smart TV, in this example, which is shown mounted on a wall of the space. However, it can take other suitable forms, and may for example comprise an image projector arranged to project the frame images into onto a surface of the illuminated space, a virtual reality (VR) and/or augmented reality (AR) headset that is worn by a user occupying the space, or even a general purpose computer device such as a tablet, desktop or laptop computer, or smartphone, or any other media device that is configured to output (i.e. play out) the video content in the space illuminated by the luminaires 4 of the lighting system 1.

In the example of FIG. 1, the following general-purpose luminaires 4 of the lighting system 1 are shown, all of which are connected to the control unit 10: a free-standing floor lamp, wall washers located on the wall either side of the media device 18, spotlights embedded in the ceiling of the room, and a portable luminaire (e.g. Hue Go) on the floor of the room. In addition, backlighting elements are shown installed behind the TV 18, which are also luminaires 4 of the lighting system 1. These may for example be LED lighting strips mounted behind (e.g. on the back of) the TV, to provide lighting effects around the TV in close proximity to it.

However, the arrangement of FIG. 1 is purely exemplary, and in general the lighting system 1 can comprise one or more luminaires 4 which can take any suitable form. For example, a basic luminaire may consist simply of a light bulb or bulbs (e.g. LED, a filament bulb or gas-discharge lamp) and any associated support structure. Other luminaires may also comprise, for example, an associated casing or housing though others may not. A luminaire can take the form of a traditional ceiling or wall mounted room luminaire, or free standing luminaire (such as a floor or table lamp, or portable luminaire); or it may take a less traditional form such as an LED-strip embedded in or installed on a surface or item of furniture, a wall washer, or any other form of illumination device adapted to provide illumination specifically. Components for communicating with the control unit 10 (e.g. dedicated circuitry, FPGA, processors and accompanying software (e.g. firmware) as applicable) may be incorporated in a light bulb with a standard fitting, to allow easy retrofitting of connected lighting functionality into existing, non-specialised lighting systems. However, this is not essential and in general these communication components can be incorporated at any suitable location in the lighting system to allow communication between the luminaires and the control unit 10.

It is noted however that the terms "luminaire", "light source" and "illumination source" are used interchangeably herein, to refer to a device which emits not just any light, but specifically illumination, i.e. light on a scale suitable for contributing to the illuminating of an environment occupied by one or more humans (so that the human occupants can see within the physical space as a consequence). Note also that the term "lighting" also refers to illumination in this sense.

The control unit 10 varies the illumination colours rendered by the luminaires 4 synchronously with the outputting of the video content by the media device 18, according to a lighting script 8.

Figures 2A, 2B:
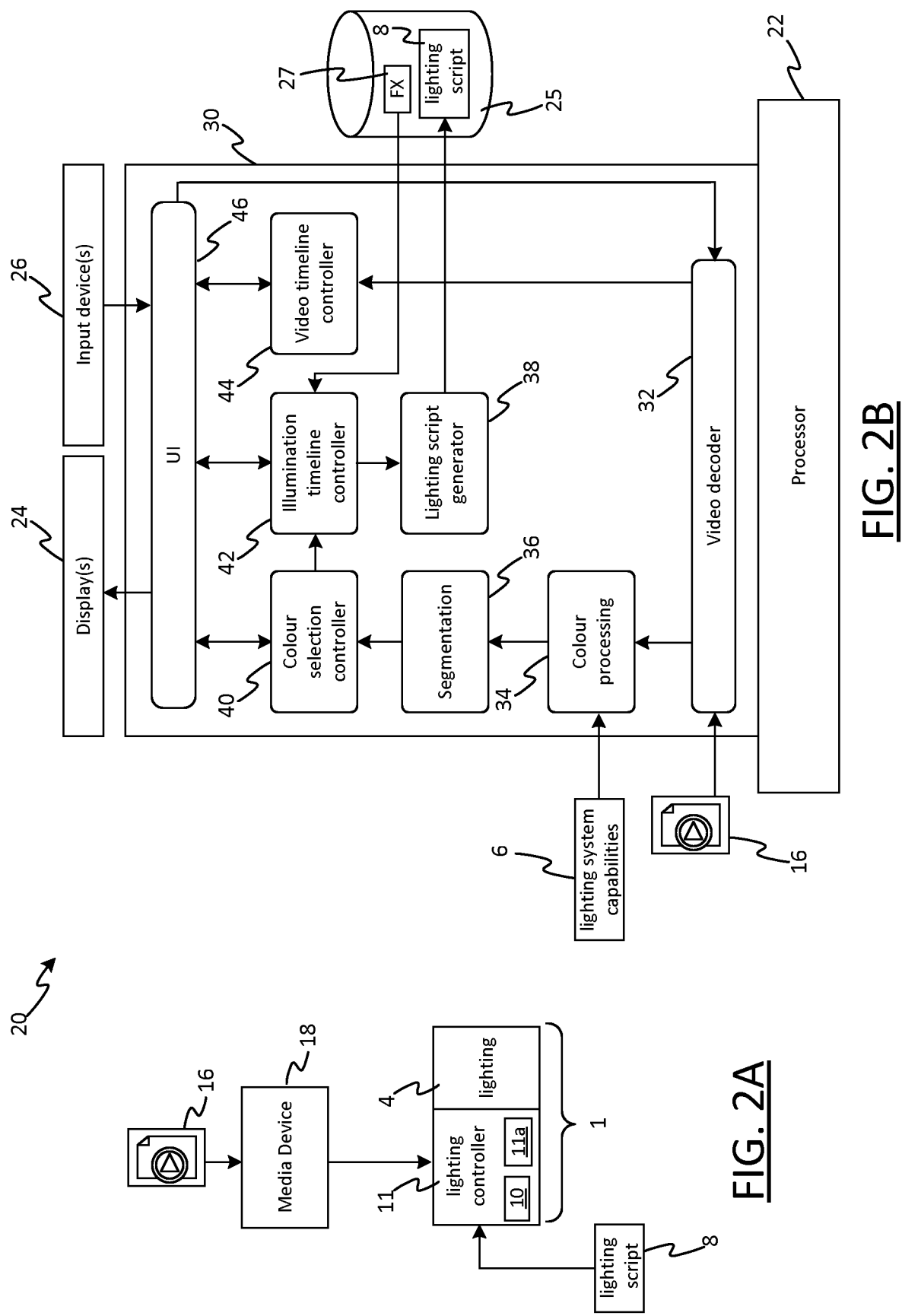
FIG. 2A shows a schematic block diagram of a lighting system.
FIG. 2B shows software modules of a scripting applications.

This is illustrated in FIG. 2A, which shows a highly schematic block diagram of the lighting system 1. A lighting controller 11 of the lighting system receives the lighting script 8, which defines lighting effects to be rendered at specific times during the outputting of the video content 16. This allows the lighting effects to be matched to specific segments of the video content, for example by controlling the luminaires 4 to render specific static or dynamic lighting effects during specific segments, by rendering one or more illumination colours that match colours in a given segment of the video content when played out, or to render dynamic illumination effects to match events in the video content (e.g. prominent, fast-modulating dynamic effects to accompany an action-packed section of the video; subtler, slowly evolving dynamic effects to match more pensive segments). This can provide an immersive experience for a user in the space who is consuming the video content outputted by the media device 18, as the illumination effects set out in the lighting script 8 can be defined to complement the video content 16 from the perspective of the user.

The lighting controller 11 comprises the control unit 10 of FIG. 1, and may or may not comprise additional components. Communication between the luminaires 4 and the lighting controller 11 can be effected in a number of different ways. For example, data transmitted and received between the lighting controller 11 and one or more of the luminaires 4 may be relayed via one or more other of the luminaires 4, i.e. the lighting network may have a mesh topology. Alternatively, data may be communicated directly between the luminaires 4 and the lighting controller 11 (i.e. not relayed via other luminaires), i.e. the lighting network may have a star topology. In general, the lighting network can have any suitable network topology, e.g. based on any suitable combination of direct and indirect (i.e. relayed) connections. The data can be communicated between the lighting controller 11 wirelessly, for example using ZigBee, Wi-Fi or Bluetooth, via wired connections, such as Ethernet or DMX connections, or a combination of two or more such technologies (wired and/or wireless). For example, the control unit 10 of the lighting controller 11 may be a gateway, which provides an interface between the lighting network (e.g. ZigBee network or DMX network) and at least one other network, e.g. TCP/IP network, such as a local network based on Wi-Fi connections, Ethernet connections or a combination of both; Bluetooth network etc. A gateway is sometimes referred to as a bridge in this context (or a DMX controller for a DMX network specifically). An example of a suitable control unit 10 is the Hue Bridge from Philips.

For such a lighting system architecture, the control unit 10 may be configured to vary the illumination colours according to instructions received from another device of the lighting controller 11 which is connected to the control unit 10, such as a smartphone or other general-purpose user device executing a suitable lighting control application (such as the Phillips Hue App, or other application built e.g. using the Philips Hue SDK or by some other means). In this case, the other device may interpret the lighting script 8, and instruct the control unit 10 to vary the illumination colours according to the lighting script. Alternatively, the bridge may also have the necessary functionality to interpret the lighting script 8, and in this case the lighting script 8 may be transmitted to the bridge from another device, or otherwise provided to the bridge for interpretation.

Alternatively, the control unit 10 may function as a standalone controller which receives and interprets the lighting script 8 to implement this functionality. For example, the architecture of the lighting system 1 may be such that no bridge is required. For example, the control unit 10 may comprise or be part of a user device (such as a smartphone, tablet, laptop or desktop computer, wearable computing device such as, an AR/VR headset, etc.) or other computing device (e.g. a server or servers) which can communicate directly with the luminaires 4 (e.g. via Wi-Fi to Ethernet) such that no gateway is needed.

As will be apparent, there is a wide variety of lighting system architectures are envisaged in which the lighting script 8 can be used to the benefit of the user.

Turning now to FIG. 2B, a computer 20 is shown which can take any suitable form, such as a laptop or desktop computer, tablet device, smartphone etc. The computer 20 comprises a processor 22. The processor 22 is formed of one or more processing units (e.g. CPU(s), GPU(s) etc.), for example a single processing unit (e.g. a CPU) or multiple processing units in a multicore processor.

The scripting application (30, FIG. 2B) referred to above is shown executed on the processor 22. Although not shown explicitly, the scripting application 30 may run on top of an operating system (OS) that is executed on the processor 22. Various code modules of the scripting application 30 are shown, namely a video decoder 32, a colour processing module 34, a video segmentation module 36, a lighting script generator 38, a colour selection controller 40, an illumination timeline controller 42, a video timeline controller 44, and a user interface (UI) layer 46. The UI layer 46 functions as an interface between the other code modules and display apparatus 24 of the computer (comprising at least one display device, such as a display screen, headset etc.) and input apparatus of the computer (comprising at least one input device, such as a mouse, trackpad, touchscreen of the display etc.). The display apparatus 24 and input apparatus 26 may comprise integrated components of the computer 20, or peripheral components of the computer 20, or a combination of both. Note that FIG. 2B is highlight schematic; the code modules 32-46 are shown in order to illustrate different functions that are performed by the scripting application 30. Various arrows are shown between the code modules 32-46; these denote high-level interactions between the code modules i.e. high-level interdependencies of these different functions, which are described below, as and are not limited to any specific arrangement of physical or logical connections.

The video decoder 32 has an input for receiving the video file 26 to be scripted when selected by a user, for example by from local electronic storage 25 of the computer 20, or from an external network (such as the Internet or a local area network).

The scripting application 30 speeds up the scripting process for the user, and makes the process easier and more enjoyable for a user of the application 30, as will be apparent in view of the following.

An important aspect of scripting a light scene is the selection of illumination colours for the light sources. With millions of colour options available, if not properly presented, the user could easily become overwhelmed, particularly if he is a novice.

For example, a typical approach adopted in existing graphics software tools is to offer a user with one of two types of generic colour selector. The first is discrete selector, with a limited number of discrete colour selection elements to choose from, such as a number (e.g. five to ten) homogenous colour blocks, each of which is individually selectable providing that number of colour choices (e.g. back, red, orange, yellow, green, blue, indigo, violet, white). The second is a colour wheel or similar i.e. a "continuous" selector that is effectively able to allow any colour to be selected from anywhere within an effectively continuous colour spectrum (e.g. spanning tens of millions of different colours, any one of which can be selected). The first type is of limited use in selecting illumination colours to match colour in the video content as it does not provide sufficient choice; the latter suffers from the opposite problem i.e. it provides far too much choice, which can be overwhelming for the user. What is therefore lacking in these existing tool is a limited but targeted choice of colours to choose from, which would be particularly useful for a novice user.

By contrast, the scripting application 30 generates a bespoke colour palette having a limited number of colours selections to choose from, but which are chosen intelligently to match colours found in the video content 16 itself. In the examples below, the bespoke colour palette 30 is used to display a discrete colour selector of the kind described above, i.e. comprising a limited number of discrete colour selection elements, but with those limited colour selections tailored to match the video content (and preferably with those colours selections restricted to colours that will be rendered properly on the available lights). That is, to provide a limited but targeted choice (which is targeted to the video content and preferably also to the colour rendering capabilities of the lighting system).

Preferably, as described below, the video content is segmented into (temporal) segments sharing similar colours, a respective bespoke colour palette is generated for each segment, and a respective discrete colour selector of this type, tailored to match that segment (and preferably to match the colour rendering capabilities of the lighting system), is displayed in association with that segment, so that the user can select appropriate illumination colours for that segment. That is, to provide a limited colour choice for each segment but which is target to that segment specifically.

Note that, in some cases, the choice may not be entirely limited to the discrete colour selector. For example, the discrete colour selector may only represent an initial choice of colour selection, i.e. a starting point which the user can then refine if desired, e.g. using a colour wheel or similar. This is still easier and quicker for the user, as the initial starting point will generally be closer to the final desired result.

The scripting tool 30 is particularly helpful for a novice user: when a person learns something new, it is helpful motivation to provide him with a helpful boost in the beginning, so that he can see from a few simple first steps an output that he can be proud of. With this scripting application, the addition of pre-generated palettes will speed up his scripting process (so that the user has something to show for his efforts very quickly), while not limiting him later on as he become a more advanced user.

Figure 3A:
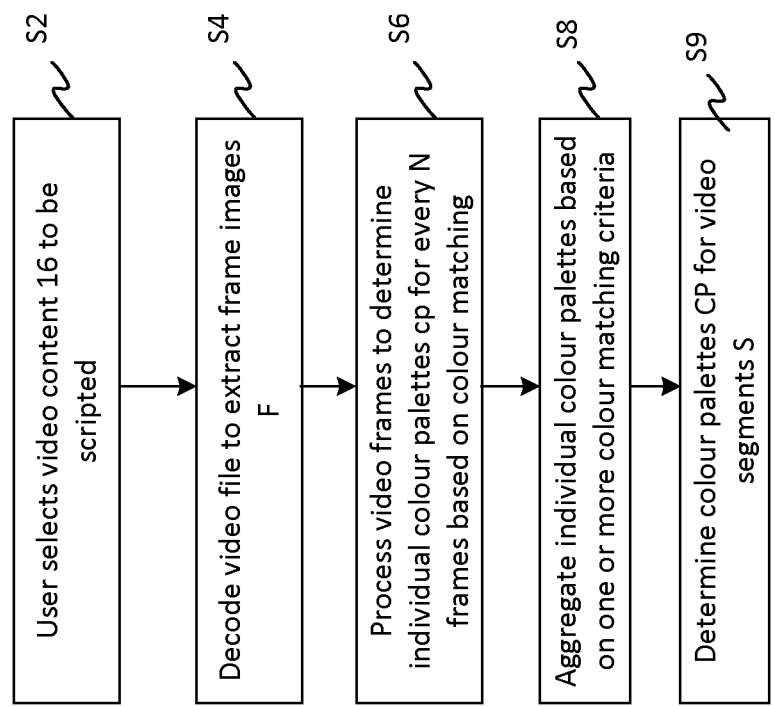
FIG. 3A shows a flowchart for a method of determining respective colour palettes for (temporal) segments of a piece of video content.

FIG. 3A shows on the left hand side a flow chart for a method of determining colour palettes of the video content 16, which will now be described. The method is a computer-implemented method, which is implemented by the scripting application 30 when executed on the processor 22. The method involves segmenting the video content into (temporal) segments based on one or more colour matching criteria. That is, the method divides a sequence of frames of the video content 16 into subsequences (the segments) of frames that share similar colours. The method also involves determining a respective colour palette for each of those segments as a whole, based on individual colour palettes of its constituent frames (e.g. of single frames or small sets of temporally adjacent frames).

Figure 3A:
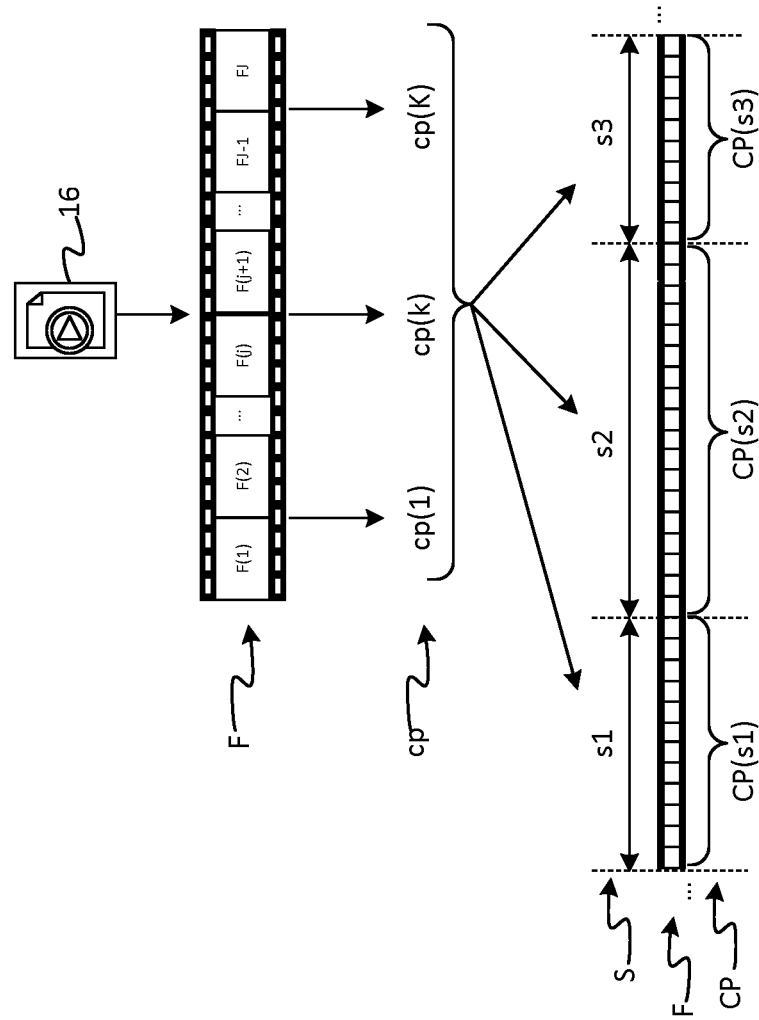

The right hand side of FIG. 3 shows a pictorial representation of the processing steps of the flow chart, to aid illustration.

At step S2, a user of the computer 30 selects the video file 16 to be scripted, via the input apparatus 26. The selection is received by the UI layer 46, which in turn triggers the video decoder 32 (as denoted by the connection from the UI layer 46 to the video decoder 32 shown in FIG. 2B) to retrieve the selected video file 16, e.g. from a local storage location or from a remote storage location via an external network.

At step S4, the video decoder 32 decodes the retrieved video file 16 to extract its constituent sequence of frame, denoted F. Individual frames of the sequence are denoted F(j) individually i.e. F(j) being the jth frame in the sequence of frames F. The total number of frames in the sequence F is denoted J. The decoder may also extract additional information form the video file 16, for example playout information conveying an overall playout duration of the frames F, i.e. the duration of the video content 16 when played out in the illuminated space. This information may comprise a value of the playout duration specifically, and/or other information such as a frame rate of the frames F (i.e. the rate at which they are to be outputted), which together with the total number of frames J defines the playout duration. The video decoder 32 outputs the extracted frame images F to the colour processing module 34 and the video timeline controller 44.

At step S6, the colour processing module 34 processes the frame images to determine a set of K individual colour palettes cp, individually denoted cp(k), i.e. cp(k) is the kth individual colour palette. In this example, the individual colour palettes cp are derived from colour histograms, generated by quantizing every set of N frames in the sequence F, where N is an integer as described below. In the case N=1, this means quantizing each frame F(j) individually to generate K=J individual colour palettes. For N>1, each individual colour palette is generated from multiple frames i.e. cp(1) from frames F(1) to F(N); cp(2) from frames F(N+1) to F(2N); cp(3) from frames F(2N+1) to F(3N) etc. In the example of FIG. 3A, N=2 but this is purely exemplary.

In general, the kth individual colour palette is generated by the colour processing module 34 applying a colour quantization function Q as follows:

$$cp(k)=Q(F_k)$$

where $F_k=\{F(j')|j'=(k-1)N+1, \ldots, kN\}$ i.e. the subset of frames from frame $F((k-1)N+1)$ to frame $F(kN)$, where $N\geq 1$.

The parameter N can be set by the user via the input apparatus 26. For example, the user may specify that an individual colour palette should be specified for every "x" seconds of video content (which may be more intuitive than setting X directly), wherein the scripting application 30 derives N from the user-specified value of x and the frame rate.

Smaller values of N may require more processing, and hence require either a greater portion of the available processing resources of the processor 22 or a take a longer amount of time to complete, but can give more provide more accurate segmentation in step S8 (see below). Hence allowing the user to set N (directly or indirectly) allows the user to choose how to balance the use of computational resources and/or overall processing time against accuracy. Alternatively, the scripting application 30 may set N automatically, based on at least one processing capability of the processor 22 in order to achieve this balance automatically.

Figure 4:
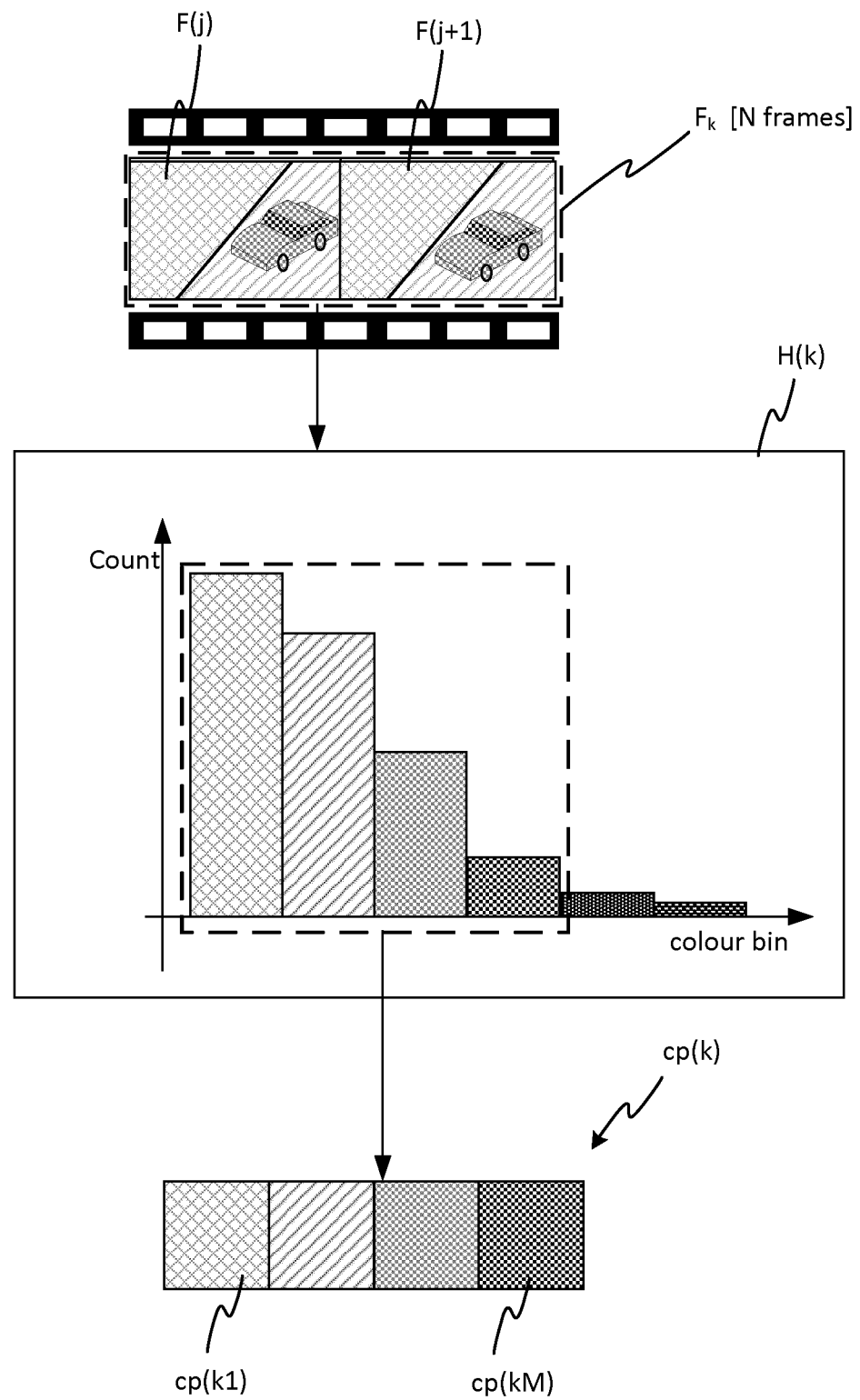
FIG. 4 demonstrates how an individual colour palette for a set of one or more frame mages may be determined based on colour quantization.

In this example, the colour processing module 42 applies the quantization function Q as illustrated in FIG. 4, by generating a respective colour histogram H(k) for each subset of frames $F_k$. The colour histogram H(k) has a plurality of colour bins, representing colour characteristics of the subset of frames $F_k$. Each bin corresponds to a "range" of colours in the subset of frames $F_k$, and denotes a relative frequency at which colours in that range occur in pixels of those frames relative to other colours (for example, it may comprise a count of colour in that range over all or a set of the frame pixels, or a relative frequency value etc.). Range in this context can mean not only a one-dimensional range of colour values, but also a multi-dimensional range, say, corresponding to an area or volume in a colour space.

The individual colour palette cp(k) is generated from the histogram H(k).

In the relatively simple example of FIG. 4, in cp(k) has M components corresponding to the M bins of the colour histogram H(k) with the highest relative frequencies (e.g. the highest counts). The mth component of cp(k) is denoted cp(km).

Preferably, however, the individual colour palettes cp are generated taking into account one or more colour rendering capabilities 6 of the lighting system 1, e.g. of the lighting system 1 as a whole and/or capabilities of individual comprise a colour gamut of the lighting system as a whole, and/or one or more colour gamuts of individual luminaire(s) or sets of luminaires 4. For example, the histogram H(k) may be biased towards colours that the lighting system is better equipped to render, e.g. by applying higher weighting factors to the bin counts for bins that the lighting system is better equipped to handle (e.g. that are within the gamut(s)) than those it is not (e.g. that are outside the gamut(s)).

A component cp(km) of the individual colour palette cp(k) may be one-dimensional (i.e. a single value) but it may also itself be a multi-dimensional vector, e.g. a three-dimensional colour vector representing a colour in a colour space (e.g. hue, saturation and brightness), such that the overall number of individual components of cp(k) is 3M. For example, cp(km) may be a one-dimensional or multi-dimensional average of the colour range spanned by the corresponding bin, or some other one-dimensional or multi-dimensional colour parameter (one-dimensional or multi-dimensional) that is representative of the colour range.

The individual colour palette cp(k) constitutes a feature vector for frames $F_k$, of overall dimension L*M, where L is the dimension of each component cp(km) (e.g. L=1, 2 or 3), i.e. in an L*M dimensional feature space.

In the case that cp(k) is a dimensional parameter (i.e. L=1, wherein cp(k) constitutes to a one-dimensional feature vector), cp(k) may for example just represent a single colour characteristic (e.g. hue, ignoring brightness and saturation), or it may represent multiple colour characteristics even if it is one-dimensional (e.g. it may be a composite value, generated by combining two or more of hue, brightness and saturation).

Note that M can also be 1, i.e. the frames $F_k$ can simply be represented by their most dominant range of colours (i.e. by the bin with the highest count).

Thus in the simplest of cases where L*M=1, each set of frames $F_k$ is simply represented by a single value denoting its most dominant colour characteristic(s), in a one dimensional feature space. More sophisticated variations have L>1 and/or M>1, which can provide more accurate results in step S8 at the cost of increased computer processing.

At steps S8-S9, based on the feature vectors cp, the video frames F are segmented, and a single respective colour palette determined for each segment s1, s2, s3, . . . to represent that segment.

At step S8 the feature vectors cp(k) are used to segment the frames F i.e. to divide the sequence of frames F into segments S of variable length exhibiting similar colour characteristic i.e. such that the colours across each segment match according to one or more colour matching criteria.

The colour matching criteria are applied to the individual feature vectors cp, wherein each segment s1, s2, s3, . . . is a set of contiguous frames (i.e. temporally adjacent in the sequence F) having similar individual colour palettes cp. This segmentation is performed by comparing the individual colour palettes cp to one another, based on one or more colour matching criteria.

For example, the segmentation module 36 may apply a hierarchical clustering algorithm to the individual colour palettes cp, wherein the individual colour are clustered in the L*M dimensional feature space according to geometrical proximity in the L*M dimensional feature space. That is, based on at least one statistical test of hierarchical cluster analysis applied to the feature vectors, i.e. the individual colour palettes cp. This hierarchical clustering may also take into account to temporal proximity within the sequence of frames F.

Hierarchical clustering refers to a process, in which clusters are initially assigned to the feature vector cp, and the cluster assignments recursively refined by splitting clusters, merging clusters or a combination of both until at least one termination criterion is reached. For example, all of the feature vectors cp may be initially assigned to a single cluster, which is then recursively split into multiple categories (divisive clustering). As another example, each of the feature vectors cp may be initially assigned to its own cluster, and the clusters then recursively merged (agglomerative clustering). Hierarchical clustering per se is known in the art, and the means of applying it to the individual the colour palettes cp in this context will be apparent in view of the present disclosure.

This is just one example, and there are other ways in which the frames F can be compared based on a comparison of their individual colour palettes cp.

The segmentation can be controlled by the user by adjusting a colour matching threshold between extracted colours in the frames. The higher the threshold, the longer the video segments will be. The threshold may be set for colours (e.g. a new segment is created when any one of feature vectors exceeds the threshold) or for an entire palette (for example through summation of the differences between the feature vectors).

The method of FIG. 3A may be customisable by the user in one or more ways, as an alternative or in addition to those set out above, such as one or more of the following.

The user may select via the input apparatus 26 one or multiple base colours that he would like to use for the light script. The segmentation module 36 searches for these base colour(s) in the video frames F and segments the video when there are large changes with respect to the base colour, for example by detecting when at least one (or a set) of difference values relative to the base colour(s) exceeds a threshold (or a set of thresholds). This gives the user some control over the light script that he wants to generate. With this form of colour-based segmentation, the user selects a desired set of colours(s) to use as basis for the segmentation—which will result in segments that contain the "desired" set of colour(s) and segments that do not contain the desired set of desired colour(s) (or that deviate to a user selectable amount from the desired set). In this case, segmentation may still occur between frames that have only small colour differences relative to one another, if those small differences are enough to take the difference(s) from the base colour(s) over the relevant threshold(s).

Alternatively or in addition, one or more base colours from may be automatically extracted from the video frames by the colour processing module 43, for example from one or more base "items" detected in the video content 16 (e.g., a main character) that the user likes and identifies in the content via the user input apparatus 26.

Alternatively or in addition, the colour processing module 34 may identify "dark gaps" in the video content 16 i.e. segments with only very dark colours, where it may be desirable to set a standard level of illumination, or mark those sections as "not renderable" or similar.

At step S9, a single respective colour palette CP(s1), CP(s2), CP(s3) is determined for each of the segments s1, s2, s3, i.e. one colour palette CP per segment S. For example, each of the colour palettes CP may be determined, for each of the segments S, as an average (e.g. mean) of the individual colour palettes cp, or by applying a separate color quantization procedure to the frames of that segment.

The determination of the segment colour palettes CP may be weighted to account for the colour capabilities 6 of the lighting system 1, as al alterative or in addition to the weighting of step S8 described above.

Rather than presenting the user with options to set "thresholds" as such, the scripting application may present these options in a more intuitive way, e.g. it may present an option for user may also select a segmentation frequency for the segmentation process, i.e. a 'tempo' of the resulting dynamics, as this may be a more intuitive concept for him than thresholds. Fast dynamics (high tempo) will cause the segmentation module 36 to segment the video in shorter pieces, slow dynamics (low tempo) will segment the video in longer segments, e.g. by setting the relevant threshold(s) based on the user-selected tempo. E.g., music video can have fast dynamics with rapid changes, nature video can have slowly changing colours.

The user may indicate key frames at the start of a segment, after which the algorithm automatically computes the duration and palette for that segment. Generally, the user may be able to specify one or more of a start of the segment, an end of a segment, and a minimum and/or maximum duration of a segment, via the user input apparatus 26, according to which the segmentation module 36 segments the sequence of frames F.

Alternatively or in addition, the segmentation module 36 can determine dynamics from the video content 16 that are not based on the colour threshold(s), for use in the segmentation process. Fast changing scenes in the video content can be detected in a number of ways, for example by calculating the colour histogram of a frame and comparing it with the colour histogram of a previous frame e.g. to calculate a "distance" between them (i.e. a difference measure that compares corresponding bins). The segmentation by the segmentation module 36 may in this case be based at least in part on a rate at which this distance changes over multiple frames. Alternatively or in addition, the segmentation may also be based on detecting and tracking objects across frames, e.g. to separate segments with fast and slow moving objects from one another; or alternatively a similar effect can be achieved by processing at the motion vectors generated by the video decoder 22 as part of the decoding process, which is a highly efficient method: in the decoder 22, the original video may be constructed from I frames (containing image colour data) and B and P frames (containing mostly motion data). From the ratio of I frames to B and P frames it is possible to determine whether there are fast changes or only slow changes. Scene cuts can be detected for example by looking for black frames, which may be incorporated into the segmentation process to align the segments with scene changes.

If the video content comprises accompanying audio data, this may additionally be used to compute further segments of the video, based on audio processing e.g. to match the segmentation to detected audio events in the audio data, allowing illumination effects to be correlated with audio events by the user.

Steps S8-9 effectively reduce the colour palettes cp in quantity, so that only those which are significantly different from one another remain.

As an alternative to the automatic segmentation of step S8, the techniques of step S9 (or similar techniques) can be applied to generate colour palettes CP for predetermined, e.g. user-defined, segments of the video content 16. That is, the same colour extraction techniques can be used to also use it to create a best-matching set of colour palettes CP for already existing video segments.

The determined segment colour palettes CP are outputted by the segmentation module 36 to the colour selection controller 40.

Figure 3B:
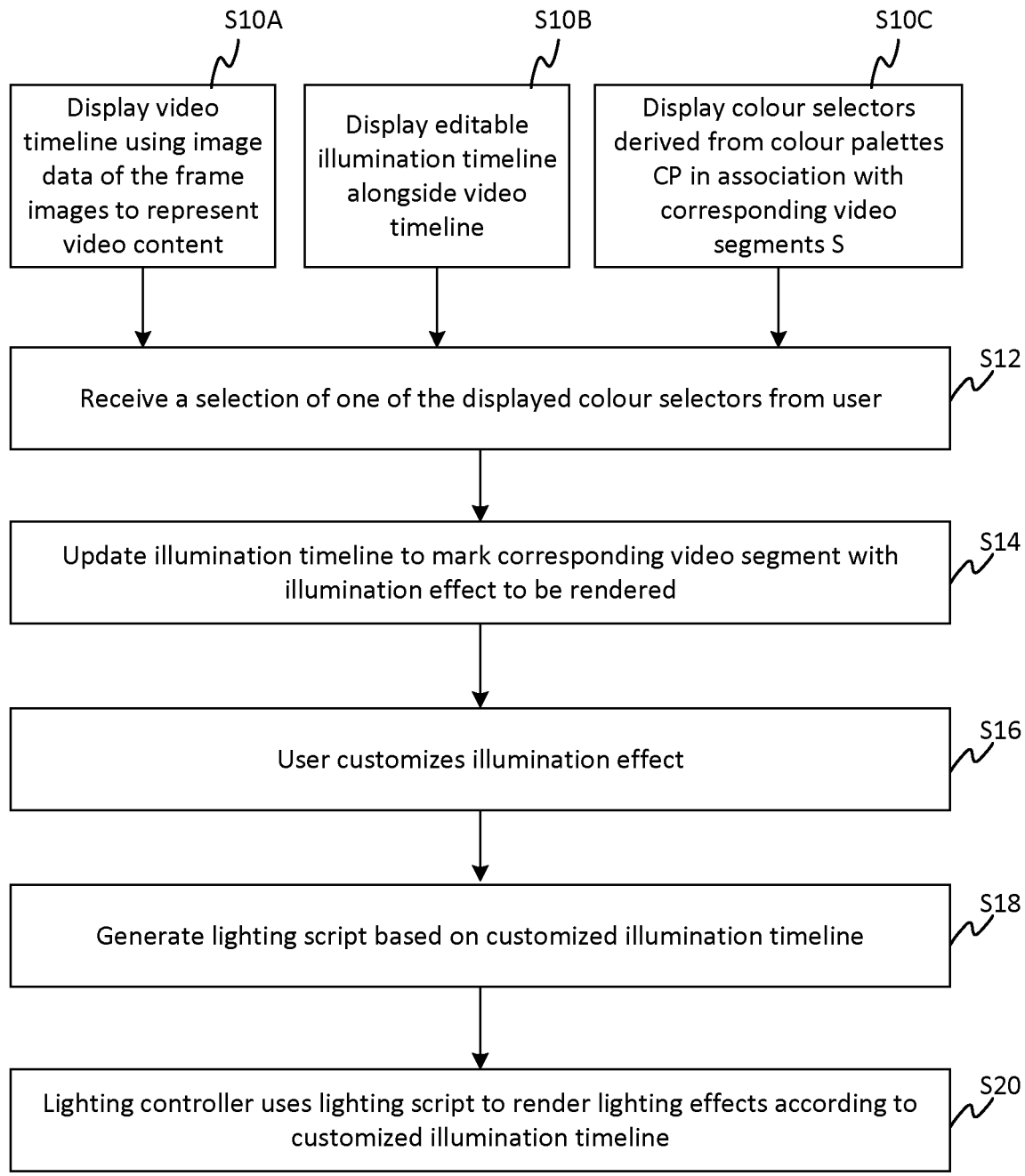
FIG. 3B shows a flowchart for a method of generating a lighting script.

FIG. 3B shows a flowchart for a method of generating a graphical user interface (GUI) by which the user can use the determined colour palettes CP in generating a lighting script. The method is a computer-implemented method that is implemented by the scripting application 30 when executed on the processor 22, as set out below.

At steps S10A-C respectively, the colour selection controller 40, the illumination timeline controller 42 and the video timeline controller 44 generate respectively colour selection display data, lighting effects timeline display data and video timeline display data in memory of the computer 20. Those data are outputted to the UI layer 46, which uses them to display the graphical user interface via the display apparatus 24. The UI layer 46 is also configured to receive user input via the input device 46, which it can convey to the modules 40-44 accordingly so that they can modify their respective display data based on the user inputs. This allows the user to interact with the graphical user interface, to cause visual changes in the GUI.

Figure 5:
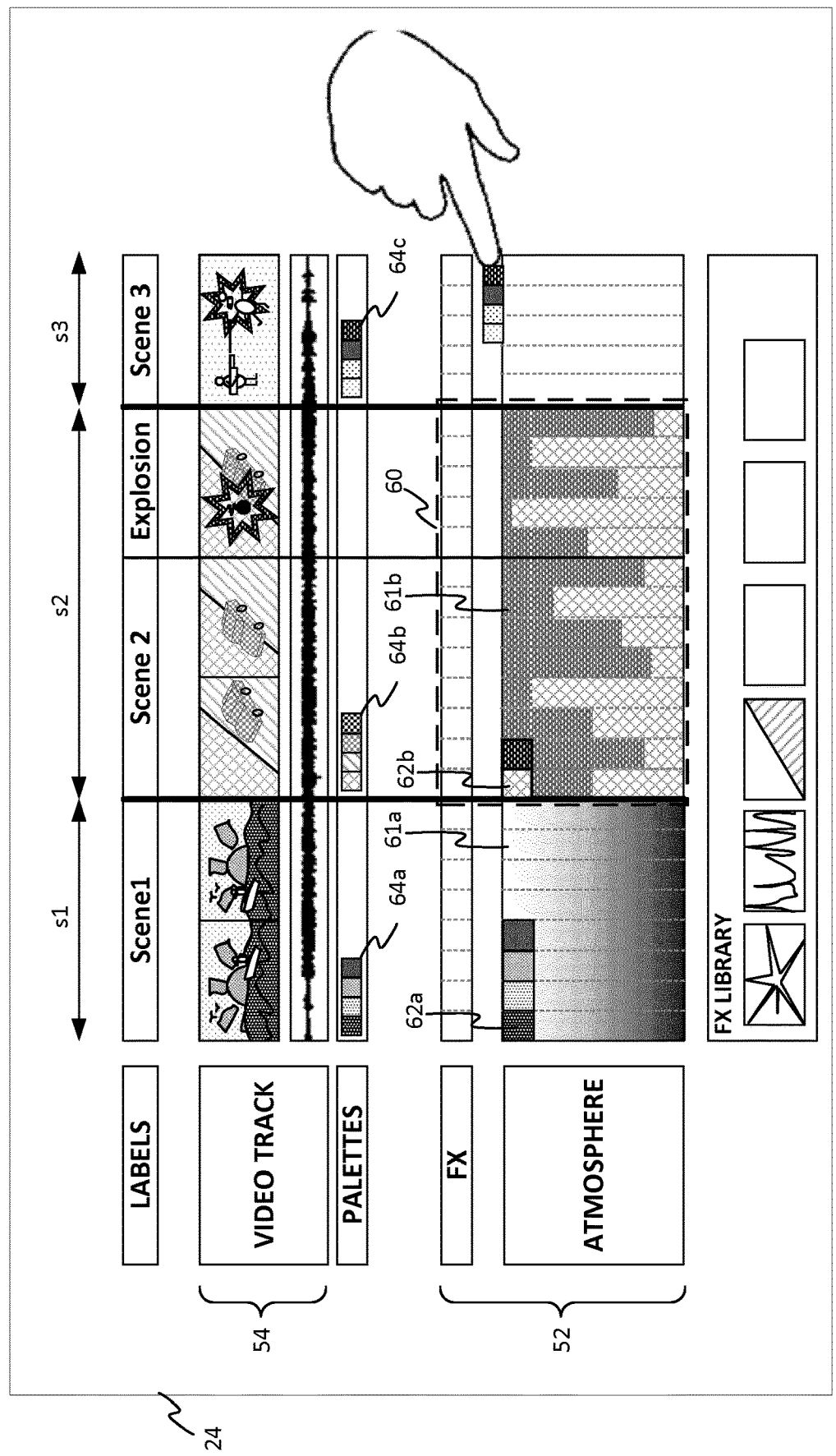
FIG. 5 shows an exemplary graphical user interface generated and displayed by a scripting application.

An exemplary GUI is shown in a display area of the display apparatus 24 in FIG. 5.

Based on the lighting effects timeline display data, an editable lighting effects timeline 52 (also referred to as the "illumination timeline" below, for conciseness) is displayed in a first region of the display area on the display. The first region is an elongate region of the display area, running horizontally (in the x direction) across the display area wherein different times during the playout of the video content 16 are represented by different x locations of the display area.

The illumination timeline 52 denotes a sequence of illumination effects to be rendered by the lighting system 1 when the video content 16 is outputted in the illuminated space. Each lighting effect is represented in a respective sub-region of the first region. Each of these sub-regions corresponds a respective one of the segments S determined at step S8. By way of example, the sub-region corresponding to segment s2 is denoted 60 in FIG. 5.

Based on the video timeline display data, a video timeline 54 is displayed in a second region of the display area. This second region is also elongated, and runs parallel to the first region. The video timeline display data includes frame image data extracted from the decoded video frames F, which is used to represent the segments S of the video content in an intuitive manner. Each of the segments S is represented in a respective sub-region of this second region associated with the sub-region of the first region representing the same segment. In this example, those sub-regions are associated by virtue of the fact that they are vertically aligned (in the y direction) and have substantially the same length in the x direction, though they can be visually associated in other ways that conveys their association to the user. The length of each sub-region may depend on the duration of the segment, to convey the duration of that segment to the user at least approximately, in an intuitive manner. The video timeline 54 may also display a representation of any audio data (e.g. a waveform) of the video content, in association with the displayed frame image data.

Based on the colour selector display data, a plurality of colour selectors 64a, 64b, 64c is displayed—one for each of the segments s1, s2, s3, and is displayed in association with that segment so that the user can see which colour selector has been derived for which video segment. The colour selector display data is generated from the segment colour palettes CP, wherein each of the colour selectors is derived from the colour palette of the video segment with which it is associated i.e. selector 64a from colour palette CP(s1), selector 64b from colour palette P(s2), and selector 64c from colour palette CP(s3).

The user of the scripting tool can then select (S12) a whole one of the displayed colour selectors, or at least one individual illumination colour from the colour selector to use in their light script, via the user input apparatus 26. By way of example, FIG. 5 shows the user dragging the whole of the colour selector 64c onto the corresponding sub-region of the illumination timeline 52 in order to select all of its colours simultaneously for the video segment s3, though alternative colour selectors can operate in different ways. This will cause a lighting effect to be added to the illumination timeline 53 (S14) in the corresponding sub-region of the illumination timeline 52 (or more accuracy, an image representing a lighting effect to be displayed in that sub-region). That is, the displayed illumination timeline 52 is updated to mark the corresponding video segment with illumination effect to be rendered based on the selected illumination colour(s).

The selection is received by the UI layer 46, and conveyed to the colour selection controller 40. In turn, the colour selection controller 40 causes the illumination timeline controller 42 to modify the illumination timeline data, and thereby cause a change in the displayed illumination timeline 52 to display an image representing a lighting effect in the corresponding sub-region, based on the selected colour(s). The lighting effect representation conveys to the user his selected colour(s) (or information about his selected colours), and provides an indication of how those colour(s) will be rendered in that lighting effect.

By way of example, FIG. 5 shows respective images 61a, 61b representing lighting effects in the corresponding sub-regions of the illumination timeline for segments s1 and s2, which have been created by the user selecting selectors 64a and 64b respectively. In this example, each of the images 61a, 61b comprises one or more colour markers 62 directly representing the colour(s) selected by the user using the colour selectors 64a and 64b respectively, denoting that corresponding illumination colours will be rendered in that lighting effect as per the user's selection(s). The user can makes these choices in the scripting tool 30 for all of the luminaires 4, at the same time or per (set of) luminaire(s) separately.

The images 61a and 61b also convey additional information about the lighting effect using highly-level graphical illustrations, for example to convey an overall impression that will be created by dynamics of the lighting effect, or a general spatial distribution of the lighting effects within the space. For instance, in FIG. 4, the images 61a and 61b also convey an impression about what the outcome is going to be when rendered by the lighting system 1, and/or whether "extra" effects have been added (e.g. from the FX library 27), it may also convey an impression of the nature of effect (e.g. that it will be rapid and attention grabbing, or that it will be subtle and slow evolving etc.), and or a timing and/or amplitude of the effect in question.

In this manner, a sequence of lighting effects is displayed via the display apparatus 26 on the illumination timeline 52.

Once the sequence of lighting effects has been created in this manner using the colour selectors 64a, 64b, 64c, the lighting effect can be modified by the user in order to customize them to his own tastes and preferences (S16, FIG. 3B). For example, the user can modify the colours to be rendered in the illumination effects, e.g. by adding additional colour markers, e.g. using the colour selectors 64a, 64b, 64c, or removing one or more of the existing colour markers 62a, 62b to the image representing the lighting effect on the illumination timeline 52. The images 61a, 61b representing those lighting effects are updated as the user makes these modification, so the user can keep track of his modification. The user can also modify these based on an electronically-stored effects (FX) library (27, FIG. 2B) e.g. stored in the local storage 25 of the computer, for example to specify that one of a predetermined set of dynamic modulations to be applied to the selected lighting colour(s) in the lighting effect to make it perceptually dynamic. As another example, one a predetermined set of spatial distributions for the selected illumination colours may be selected from the FX library for one of the lighting effects on the illumination timeline 52. The FX library 29 may be a "factory" library supplied with the application 30, or user-defined, or a combination of both i.e. comprising both factory effects and the user's own defined effects which he can create and save in the library 29.

As an alternative to creating lighting effects on the illumination timeline 52 when the user selects the colour selectors 64a, 64b, 64c, lighting effects may be created automatically on the illumination timeline 52, by automatically selecting one or more illumination colours based on the determined colour palettes CP. In this case, the use can still modify the effect on the illumination timeline 52 in the same manner, but does not have to create them on the timeline 52 initially.

The lighting script generator 38 generates a lighting script 8 in the local storage 25 of the computer 20 (S18). The lighting script embodies the sequence of lighting effects that are displayed on the illumination timeline 52 in a form that can be supplied to the lighting controller 11 for use in controlling the lighting system 1 to actually render the displayed effects as the video content 16 is played out, i.e. to actually render the sequence of lighting effects conveyed by the displayed images 61a, 61b, including any modifications made to them by the user. The lighting script 8 may for example be rendered in response to a rendering instruction from the user via the input apparatus 26, or it may be generated at the start of the process and constantly updated as the user modifies the illumination timeline 52 to incorporate the user's modifications.

The generated lighting script 8 is supplied to the lighting controller 11, which uses it (S20) to render the sequence of illumination effects as the video content 16 is played out by the media device 18, as described above. To this end, the lighting controller 11 comprises a script rendering module (11A, FIG. 2A) which can receive and interpret the lighting script 8, allowing the lighting controller 11 to control the luminaires 4 to render the sequence of illumination effects synchronously with the playout of the video content i.e. so that the illumination effect for each of the segments S is rendered when (and only when) that segment is outputted by the media device 8, based on tracking the outputting of the video content by the media device 18.

For example, the palettes CP for all segments may be used to automatically generate to generate a basic light script that creates a dynamic (or static) light atmosphere for the duration of each segment of the video, with illumination colours automatically matched to the corresponding segments of the video content 16 based on the colour palettes CP. The user may even choose to supply this basic lighting script to the lighting controller 11, so that they can see how it looks when rendered in the illuminated space. Having done this, the user might choose to adjust colours or to disable the basic behaviour and use the extracted colours in a different way (e.g. for creation of special light effects). This can be a very useful way of teaching a novice user the features of the scripting tool 30, whilst at the same time allowing him to create his own customized and perceptually pleasing lighting effects efficiently.

The script rendering module 11a can for example be a component of the scripting application 30 itself, or another application executed on the processor 32, or software executed on a different processor e.g. of a different device (e.g. a processor of control unit 10). For example, the script rendering module 11a may be built using the Hue SDK available from Philips.

If the lighting setup of the lighting system 1, and in particular if information about the locations of the luminaires 4 in the space, is known to the scripting application 30, the user may indicate location information for the colours and dynamics in the lighting effects on the illumination timeline 52. For example, in this case the user can set the above mentioned scripting options for each of the (or a group of) lamps in the room. For example, the user can decide to use slower dynamics in lamps further away from the screen and faster dynamics for lamps closer to the screen or use a different set of base colours for different lamps. This allows the user to control the spatial distribution of the lighting effects to be rendered in the space.

Whilst certain exemplary architectures of the lighting controller 11 have been considered above, the term "lighting controller" generally refers to any control apparatus that is capable of controlling one or more luminaires of a lighting system according to a generated lighting script. It can be implemented in hardware, software or a combination of both. For a software (or partially software) implementation, the lighting controller comprises at least one processor to execute control code to implement the lighting controller functionality (or at least part of it). The at least one processor may be a single processor, for example that is part of a bridge where applicable, or part of some other computer device of the lighting controller 11 (e.g. a user device, or server). Alternatively, the lighting controller 11 may comprise multiple processors (possibly distributed over multiple locations) each of which executes a respective portion of the control code to implement a respective part of the functionality of the lighting controller 11. "Code" in the context covers any form of software, such as firmware, higher level software or a combination of both. Alternatively or in addition, some or all some of the functionality of the lighting controller 11 may be implemented in dedicated hardware of the lighting controller such as an application specific integrated circuit(s) and/or using programmable hardware such as a FPGA(s).

It will be appreciated that the above embodiments have been described by way of example only. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A computer-implemented method of generating a lighting script for a piece of video content, the lighting script for use by a lighting controller to control at least one luminaire to render illumination effects, as the video content is outputted in a space illuminated by the at least one luminaire, synchronously with the outputting of the video content, the method comprising executing a scripting application on a computer to implement the following steps:
    processing frame image data of the video content to determine at least one colour palette of the frame image data;
    controlling display apparatus of the computer to display to a user of the computer a sequence of illumination effects to be rendered during the outputting of the video content, wherein the displayed sequence conveys at least one illumination colour derived from the determined colour palette to be rendered in at least one of the illumination effects;
    receiving from the user via user input apparatus of the computer at least one effect modification instruction, and modifying the displayed sequence of illumination effects according to the received at least one instruction; and
    generating a lighting script for use by the lighting controller in controlling the at least one luminaire during the outputting of the video content in the illuminated space to render the modified sequence of illumination effects,
wherein the processing step comprises determining a respective colour palette of each of a plurality of segments of the video content;
    wherein the displayed sequence of illumination effects comprises a respective illumination effect for each of the segments of the video content, and conveys to the user, for at least one of the segments, at least one illumination colour derived from its respective colour palette to be rendered in its respective illumination effect.

2. The method of claim 1, wherein the steps further comprise:
    controlling the display apparatus to display a colour selector derived from the determined colour palette, wherein the at least one illumination colour is selected by the user via the user input apparatus of the computer using the displayed colour selector.

3. The method of claim 1, wherein the steps further comprise:
    processing the video content to generate a video timeline conveying visual changes in the video content; and
    controlling the display apparatus to display the video timeline in association with the sequence of illumination effects.

4. The method of claim 1, wherein the processing step comprises automatically determining the segments by comparing to one another respective colour characteristics of frame images of the video content.

5. The method of claim 4, wherein the processing step comprises determining a plurality of individual colour palettes for the frame images, which are used in said comparison.

6. The method of claim 5, wherein said comparison comprises:
    applying a hierarchical clustering algorithm to the individual colour palettes, and/or
    comparing differences between the individual colour palettes with a colour matching threshold,
    detecting deviations in the individual colour palettes from a base colour.

7. The method of any of claim 4 wherein the segments are automatically determined according to at least one segmentation instruction received from the user via the user input apparatus.

8. The method of claim 7, wherein the at least one segmentation instruction from the user sets at least one of the following:
    a number of frames images for which each of the individual colour palettes is to be determined,
    the colour matching threshold,
    a base colour,
    a start point for a segment,
    an endpoint for a segment,
    a segmentation frequency,
    a maximum segment duration,
    a minimum segment duration.

9. The method of claim 6, wherein the base colour is determined automatically, by the scripting application, by processing the frame images.

10. The method of claim 1, wherein the steps comprise generating at least one colour histogram of the frame image data, which is used to determine the at least one colour palette.

11. The method of claim 1, wherein the steps further comprise receiving an indication of at least one colour rendering capability of the at least one luminaire, which is used by the scripting application in the processing step to generate the at least one colour palette.

* * * * *